US009024812B2

(12) United States Patent  (10) Patent No.: US 9,024,812 B2
Smith  (45) Date of Patent: May 5, 2015

(54) SYSTEMS AND METHODS FOR PROVIDING ANTENNA CALIBRATION

(75) Inventor: Mark D. Smith, Glendale, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 83 days.

(21) Appl. No.: 13/096,975

(22) Filed: Apr. 28, 2011

(65) Prior Publication Data

US 2011/0267216 A1 Nov. 3, 2011

Related U.S. Application Data

(60) Provisional application No. 61/329,024, filed on Apr. 28, 2010.

(51) Int. Cl.
G01S 13/00 (2006.01)
G01S 13/74 (2006.01)
G01S 7/40 (2006.01)
G01S 5/02 (2010.01)
G01S 5/04 (2006.01)
G01S 3/02 (2006.01)
G01S 3/48 (2006.01)
G01S 13/78 (2006.01)
G01S 13/93 (2006.01)

(52) U.S. Cl.
CPC . *G01S 3/023* (2013.01); *G01S 3/48* (2013.01); *G01S 7/4026* (2013.01); *G01S 13/781* (2013.01); *G01S 13/9303* (2013.01)

(58) Field of Classification Search
USPC ............ 342/29–51, 147–158, 165–174, 417, 342/420, 442
See application file for complete search history.

(56) References Cited

U.S. PATENT DOCUMENTS

| 3,346,861 | A | * | 10/1967 | Chadwick et al. | 342/153 |
| 4,855,748 | A | * | 8/1989 | Brandao et al. | 342/455 |
| 5,008,844 | A | * | 4/1991 | Kyriakos et al. | 702/106 |
| 5,122,808 | A | * | 6/1992 | Kyriakos | 342/442 |
| 5,191,349 | A | * | 3/1993 | Dinsmore et al. | 343/751 |
| 5,402,130 | A | * | 3/1995 | Sherman | 342/152 |
| 5,469,172 | A | * | 11/1995 | Schleder et al. | 342/174 |
| 5,604,504 | A | * | 2/1997 | Nail | 342/417 |
| 6,064,335 | A | * | 5/2000 | Eschenbach | 342/357.31 |
| 6,169,519 | B1 | * | 1/2001 | Holecek et al. | 342/442 |
| 6,392,598 | B1 | * | 5/2002 | Jones et al. | 342/442 |
| 6,512,975 | B2 | * | 1/2003 | Watson | 701/120 |
| 6,657,578 | B2 | * | 12/2003 | Stayton et al. | 342/30 |
| 6,789,016 | B2 | * | 9/2004 | Bayh et al. | 701/301 |

(Continued)

*Primary Examiner* — Peter Bythrow
(74) *Attorney, Agent, or Firm* — Allen J. Moss; Squire Patton Boggs (US) LLP

(57) ABSTRACT

Systems and methods for providing antenna calibration can be used in a variety of applications. A method of calibrating an antenna array for use in a traffic advisory system or traffic alert and collision avoidance system provide a mechanism that renders complex combining circuitry unnecessary in the array. A method can include receiving an unsolicited reply that contains absolute position information of an intruder aircraft. The method can also include determining a bearing of a signal encoding the reply based on a phase relationship of the signals from an antenna array not configured to operate with an internal self-test phase calibration mechanism. The method can further include comparing the bearing based on the phase relationship with a bearing calculated by a comparison of the absolute positions of a host aircraft and the intruder aircraft. The method can additionally include calibrating the antenna array based on the result of the comparison.

7 Claims, 8 Drawing Sheets

Four Element Array Removing Differential Phase Ambiguity

(56) References Cited

U.S. PATENT DOCUMENTS

| | | | |
|---|---|---|---|
| 6,799,114 B2* | 9/2004 | Etnyre | 701/120 |
| 7,218,277 B1* | 5/2007 | Smith | 342/359 |
| 7,414,567 B2* | 8/2008 | Zhang et al. | 342/29 |
| 7,420,501 B2* | 9/2008 | Perl | 342/30 |
| 7,499,803 B2* | 3/2009 | Hunter et al. | 701/412 |
| 7,605,747 B1* | 10/2009 | Mookerjee et al. | 342/90 |
| 7,724,178 B2* | 5/2010 | Brandao et al. | 342/29 |
| 8,049,662 B2* | 11/2011 | Stayton | 342/174 |
| 8,054,215 B2* | 11/2011 | Abbett et al. | 342/37 |
| 8,362,943 B2* | 1/2013 | Jacobs et al. | 342/29 |
| 2002/0188398 A1* | 12/2002 | Watson | 701/120 |
| 2003/0233192 A1* | 12/2003 | Bayh et al. | 701/301 |
| 2006/0009909 A1* | 1/2006 | Smith | 701/301 |
| 2006/0267829 A1* | 11/2006 | Brandao et al. | 342/29 |
| 2007/0109190 A1* | 5/2007 | Smith | 342/359 |
| 2008/0150784 A1* | 6/2008 | Zhang et al. | 342/30 |
| 2008/0204310 A1* | 8/2008 | Blessing et al. | 342/195 |
| 2009/0027258 A1* | 1/2009 | Stayton | 342/174 |
| 2009/0109085 A1* | 4/2009 | Needham et al. | 342/174 |
| 2009/0167591 A1* | 7/2009 | Abbett et al. | 342/37 |
| 2012/0001793 A1* | 1/2012 | Jacobs et al. | 342/146 |

* cited by examiner

Figure 1. Two Element Array Showing Phase Differential

Figure 2. Four Element Array Removing Differential Phase Ambiguity

SYSTEMS AND METHODS FOR PROVIDING ANTENNA CALIBRATION

CROSS REFERENCE TO RELATED APPLICATIONS

The present application claims the priority of and is related to U.S. Provisional Patent Application No. 61/329,024, filed Apr. 28, 2010, the entirety of which is hereby incorporated herein by reference.

BACKGROUND

1. Field

Systems and methods for providing antenna calibration can be used in a variety of applications. A method of calibrating an antenna array for use in a traffic advisory system, sometimes referred to as a traffic awareness system, or traffic alert and collision avoidance system provide a mechanism that renders complex combining circuitry, beamforming circuitry, and internal calibration circuitry unnecessary in the array.

2. Description of the Related Art

There are various techniques for calibration of antennas using internal sources. Calibration is generally accomplished using an internal circuit which is capable of generating a test signal of a known equivalent bearing that is then received by the elements. The phase relationship between the signals received by the elements is a function of bearing. Consequently, variable and unknown phase constants (antenna cables, receiver front end differences, and the like) can be compensated out of the equation.

U.S. Pat. No. 5,469,172 discusses an internal calibration apparatus used to inject a "known" phase signal into the elements. This known phase signal may correlate to a particular bearing angle. Subsequent bearing measurements may be made relative to this reference to get absolute bearing.

U.S. Pat. No. 4,855,748 discusses an additional method of injecting a self test calibration signal to aid in calibrating out phase errors in the receive system.

U.S. Pat. No. 5,191,349 discusses reviewing the means by which the TCAS directional antenna accomplishes bearing detection.

U.S. Patent Application Publication No. 2006/0009909 discusses means for using positional data of both an intruder and a host aircraft to provide a correction factor to the measured bearing data so as to more nearly perfect the data. However this may still rely on an internal beam forming network to determine the initial bearing estimate.

Another approach for antenna calibration may include locating the antenna very close to the receiver and connecting the two with a very short, precisely manufactured set of matched cables. Thus, the phase lengths between the antenna elements and the receivers may be ideally equal. However, this approach does not compensate for aging and temperature variations that do not affect each channel identically.

SUMMARY

In certain embodiments, a method includes receiving an unsolicited reply that contains absolute position information of an intruder aircraft. The method also includes determining a bearing of a signal encoding the reply based on a phase relationship of the signals from an antenna array not configured to operate with an internal self-test phase calibration mechanism. An internal self-test phase calibration mechanism could be within the antenna or within a transmitter or receiver unit. The method further includes comparing the bearing based on the phase relationship with a bearing calculated by a comparison of the absolute positions of a host aircraft and the intruder aircraft. The method additionally includes calibrating the antenna array based on the result of the comparison.

A method according to certain embodiments includes receiving an interrogation response signal from an antenna array not configured to operate with an internal self-test phase calibration mechanism. The method also includes processing the received interrogation response signal to provide position information regarding an intruder aircraft. The method further includes receiving calibration information regarding the intruder aircraft. The method additionally includes calibrating the processor of the received interrogation response signal based on the calibration information.

A method, in certain further embodiments, includes providing a display of an intruder aircraft to a pilot. The method also includes interacting with the pilot to obtain a correction to a position of the intruder aircraft. The method further includes recalibrating an antenna array based on the correction to the position of the intruder aircraft.

In certain embodiments, a computer program encoded on a computer-readable medium performs, in hardware, any of the preceding methods.

A system according to certain embodiments includes at least one processor and at least one memory including computer program instructions. The at least one memory and the computer program instructions are configured to, with the at least one processor, cause the system at least to determine a bearing of a signal encoding a received unsolicited reply that contains absolute position information of an intruder aircraft, based on a phase relationship of the signals from an antenna array not configured to operate with an internal self-test phase calibration mechanism. The at least one memory and the computer program instructions are also configured to, with the at least one processor, cause the system at least to compare the bearing based on the phase relationship with a bearing calculated by a comparison of the absolute positions of a host aircraft and the intruder aircraft. The at least one memory and the computer program instructions are further configured to, with the at least one processor, cause the system at least to calibrate the antenna array based on the result of the comparison.

In certain embodiments, a system includes at least one processor and at least one memory including computer program instructions. The at least one memory and the computer program instructions are configured to, with the at least one processor, cause the system at least to provide a display of an intruder aircraft to a pilot. The at least one memory and the computer program instructions are also configured to, with the at least one processor, cause the system at least to interact with the pilot to obtain a correction to a position of the intruder aircraft. The at least one memory and the computer program instructions are further configured to, with the at least one processor, cause the system at least to recalibrate an antenna array based on the correction to the position of the intruder aircraft.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Embodiments of the present invention may be used in connection with a TCAS (Traffic alert and Collision Avoidance System), micro-TCAS, or TAS (Traffic Advisory System) product, as well as a combined transponder and TAS. Other embodiments are also permitted. These products may be used, for example, in general aviation aircraft. One approach according to certain embodiments, therefore, may provide a combined transponder and a TAS that uses an omnidirectional antenna on the bottom and a directional antenna on the top. The purpose of the omnidirectional antenna may be to transmit interrogations and replies omnidirectionally, while the purpose of the directional antenna may be to receive replies directionally in order to determine bearing of an intruder.

Many antenna designs exist today that are capable of providing bearing in a receive mode, including a TCAS directional antenna, available from Aviation Communication & Surveillance Systems (ACSS). Antennas providing bearing achieve this generally by utilizing multiple elements. Interferometry techniques use the phase relationship between the elements to determine bearing. One common method used for such bearing determinations is the sum and difference model of phase monopulse. On the other hand, the ACSS TCAS directional antenna uses amplitude monopulse to determine bearing.

Figure 1:
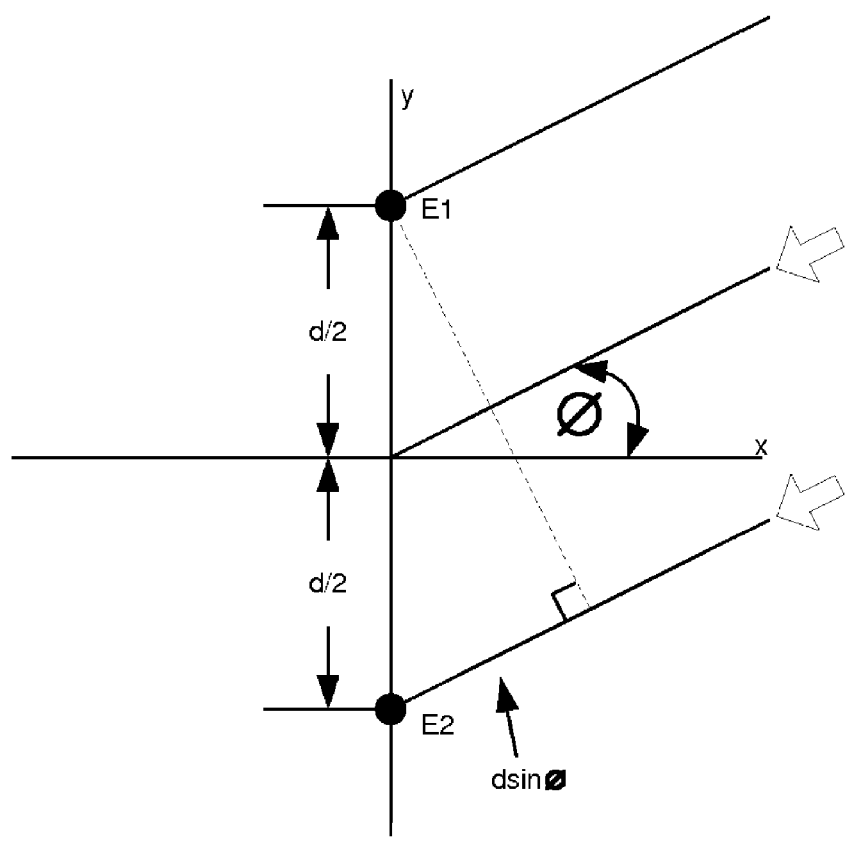
FIG. 1 illustrates a two element array showing phase differential.

FIG. 1 illustrates a case in which two elements are receiving a plane wave as shown in FIG. 1. From FIG. 1, it can be determined that the differential phase between the two elements is due to their position in space. The differential phase is equal to the electrical length of $d \sin \phi$. Two special cases help clarify the explanation and reveal a shortcoming in a two element solution. First, when the source is anywhere on the x axis, the signals incident on the two elements will have equal phase. Alternatively, when the source is on the positive half of the y axis, the phase of the signal incident on element 1 will lead that on element 2, while on the negative half of the y axis, the opposite is true. It can quickly be seen that because of the symmetry of the two element array, there are multiple locations where the differential phase between the two elements is equal. This leads to ambiguity in determining phase from a two element array.

Figure 2:
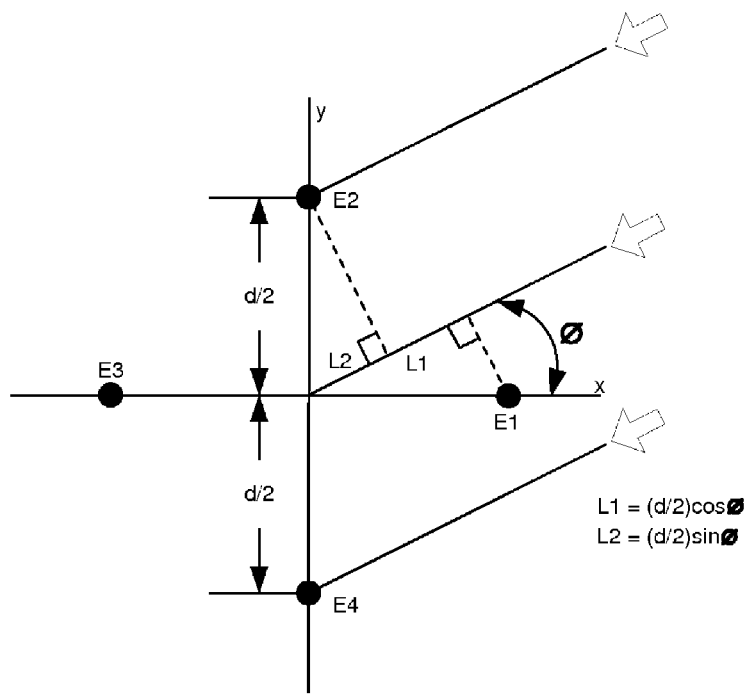
FIG. 2 illustrates a four element array capable of removing differential phase ambiguity.

If this concept were extended to a pair of two element arrays, the resultant 4 element array eliminates the ambiguity and permits determination of the bearing of the incident signal by comparing the relative phases on the elements. FIG. 2 shows such a 4 element array. However because the cables attached to each element have an unknown and potentially variable phase length, by the time the phase information is passed from the antenna element to the receiver, the significance of the phase and the ability to recover bearing information is lost. Thus, there is a need for calibration thereof.

Table 1 illustrates the difference in length from each element to the phase center of the array, which is chosen to be in the center of the 4 elements. In the table, each cell must be multiplied by d/2 to get the effective distance in the direction of the angle of incidence. This can be translated into electrical length by dividing this number by the wavelength. Phi ($\phi$) is the angle of incidence relative to the x-axis and positive numbers represent phases that lead the phase center of the array, while negative numbers lag the array phase center. Table 1, as shown below, demonstrates that the phase differences between elements may be directly correlated to the bearing angle:

TABLE 1

Four Element Array Distance from Phase Center vs. Incident Angle

| $\phi$ | E1 to P.C. | E2 to P.C. | E3 to P.C. | E4 to P.C. |
|---|---|---|---|---|
| 0 | 1.00 | 0.00 | −1.00 | 0.00 |
| 15 | 0.97 | 0.26 | −0.97 | −0.26 |
| 30 | 0.87 | 0.50 | −0.87 | −0.50 |
| 45 | 0.71 | 0.71 | −0.71 | −0.71 |
| 60 | 0.50 | 0.87 | −0.50 | −0.87 |
| 75 | 0.26 | 0.97 | −0.26 | −0.97 |
| 90 | 0.00 | 1.00 | 0.00 | −1.00 |
| 105 | −0.26 | 0.97 | 0.26 | −0.97 |
| 120 | −0.50 | 0.87 | 0.50 | −0.87 |
| 135 | −0.71 | 0.71 | 0.71 | −0.71 |
| 150 | −0.87 | 0.50 | 0.87 | −0.50 |
| 165 | −0.97 | 0.26 | 0.97 | −0.26 |
| 180 | −1.00 | 0.00 | 1.00 | 0.00 |
| 195 | −0.97 | −0.26 | 0.97 | 0.26 |
| 210 | −0.87 | −0.50 | 0.87 | 0.50 |
| 225 | −0.71 | −0.71 | 0.71 | 0.71 |
| 240 | −0.50 | −0.87 | 0.50 | 0.87 |
| 255 | −0.26 | −0.97 | 0.26 | 0.97 |
| 270 | 0.00 | −1.00 | 0.00 | 1.00 |
| 285 | 0.26 | −0.97 | −0.26 | 0.97 |
| 300 | 0.50 | −0.87 | −0.50 | 0.87 |
| 315 | 0.71 | −0.71 | −0.71 | 0.71 |
| 330 | 0.87 | −0.50 | −0.87 | 0.50 |
| 345 | 0.97 | −0.26 | −0.97 | 0.26 |
| 360 | 1.00 | 0.00 | −1.00 | 0.00 |

In phase monopulse systems, the signals may be passed from the elements through the antenna cables to the receivers where phase calibration constants are applied in order to recover bearing information. Many calibration techniques have been developed to determine and compensate for the unknown phase shifts between the antenna elements and the receive circuitry. These calibration techniques can involve complex hardware solutions and software algorithms.

The current TCAS directional antenna, available from ACSS, embeds the bearing information into the ratio of signal amplitudes present on adjacent pairs of connectors. The internal beam forming network takes the signal inputs from each element and precisely combines them using appropriate phase shifting circuitry, namely quadrature combiners, such that the bearing information is entirely present in the amplitude vs. azimuth angle radiation pattern. Thus, all phase sensitivity is removed from the bearing determination and all critical information is contained within the amplitude present on the 4 cables.

Certain embodiments of the present invention utilize an antenna that is capable of providing directional receive beams with no active calibration or internal beam forming network circuitry required, and without precisely measured cables for installation. The difference in the signal phase received at each of the elements may be directly related to the bearing of the angle of incidence.

Figure 3:
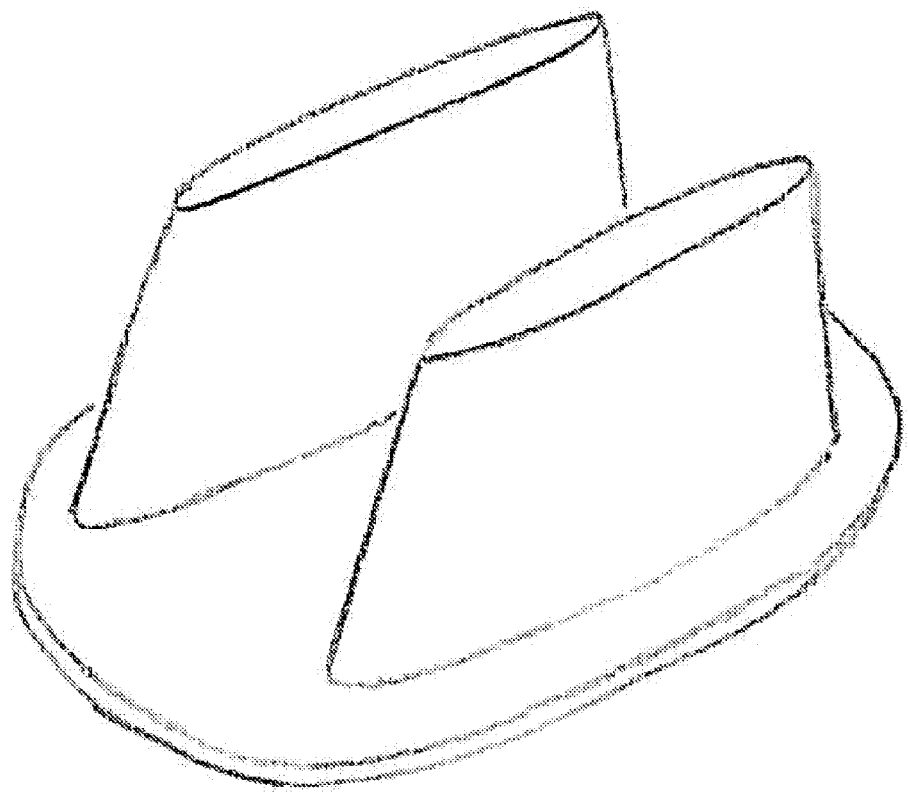
FIG. 3 illustrates a simple antenna that can be used in connection with certain embodiments of the present invention.

As an example, a receiving antenna can be a simple four-element monopole array with each element connected directly to a receiver via an antenna cable. For example, the antenna can include four full height quarter wavelength monopoles in a square array. The elements may be arranged, for example, in a square pattern in such a way that there are two rows of two elements, with each row housed in a fin, as shown, by way of example, in FIG. 3. These elements can be encapsulated in a radome for increased strength and aerodynamic efficiency.

Variations of the above antenna can also be utilized while remaining consistent with embodiments of the present invention. For example, larger arrays of antenna elements can be employed in certain embodiments.

A host aircraft can be equipped to have the capability to determine its own true position, for example, through latitude and longitude data provided by a global positioning system (GPS) receiver. A host aircraft may also be able to receive and decode positional data from an intruder aircraft. This positional information can be embedded in the transmission. Therefore, a host aircraft may be able to determine an accurate bearing reading based on the comparison of the two positional data points. With this information regarding the bearing angle of the intruder, the host aircraft can precisely establish the expected phase relationship between the elements. After the signal has been transferred from the antenna element to the receiver over the antenna cable, the signal may be characterized by an I/O demodulator which may detect both the received signal phase and amplitude.

After passing through an uncontrolled cable, the precise phase relationship may have been lost. One reason that the precise phase relationship may be lost is that the cable lengths from each of the antenna elements to the corresponding receiver may be different from one another. Thus, the phase of a signal that propagates along the cable may experience some additional phase offset due to the difference in cable length. Moreover, temperature and aging or sagging can affect the length of the cable. These and other factors can create additional phase offsets that are not due to the position of the intruder aircraft.

Therefore, a correction factor or offset can be applied to the signal phase received at each receiver such that the phase relationship amongst the elements can be re-established and the bearing information can be recovered. This may be accomplished by simply knowing what the phase relationship should be versus what it is measured to be. The difference between the measured phase relationship and the expected phase relationship can become the correction factor. These correction factors can then be stored and applied to signals received from intruders not transmitting their own position data. The correction factors may be periodically updated as the insertion phase changes for each path due to temperature effects, aging and other influences as position reporting intruders are available.

It should be noted updates to the receivers do not have to be performed on the entire display region. Instead, a sector of the display region can be updated, such as a quadrant or a 45 degree segment. Thus, it is not necessary that the update affect the entire display area.

An alternate method may be used for times when the system has no positional data available for the intruder. The system may be calibrated initially at least once before being put into service, so that it may be ensured of operating correctly. However, it is possible that no position reporting intruders will have been encountered for a long time. Additionally, because of changes in the physical characteristics of the antenna elements, cables, or the like (or for other reasons), the phase correction factors may have begun degrading. Thus, the pilot may notice a developing error factor in the displayed intruder bearing versus the bearing the pilot sees with the pilot's own eyes. A means of manually calibrating the system can be performed.

Manual calibration can be accomplished by providing a mechanism to enable the selection of a particular intruder symbol on the display. The pilot can use a touch screen, arrow keys on a keypad, character keys to type out an identifier for an intruder, or similar selection means to select the particular intruder symbol. After selecting which intruder is to be used to perform the calibration, the pilot can enter a manual calibration.

The manual calibration can be performed various ways. For example, after selecting the intruder, the pilot could select to enter a manual calibration mode or the pilot could be entered into manual calibration mode automatically upon selection of the intruder. The pilot could then be prompted to enter the estimated current bearing of the intruder relative to the host aircraft. In a further instance, the pilot could be prompted to enter an estimated range or an estimated altitude of the intruder relative to the host aircraft. The system could then, based on the pilot's correction information such as estimated bearing, calculate a new set of correction offsets.

The system could then offer the pilot an opportunity to review the updated bearing readings on the display, prior to making these corrections permanent. The updated bearing readings can be illustrated to the pilot by displaying the intruder at the old location in one color or shading and at the new location by a second color or shading. If the pilot decides that the updated bearing readings are acceptable, the pilot can accept the corrections. If the pilot decides that the updated bearing information is incorrect, the pilot can perform another manual calibration or can revert to the previous settings.

In an alternative embodiment, a pilot can associate provide a correction by associating a track provided from a TAS or TCAS system with a track provided by another system. For example, if the pilot's display displays the track of an intruder based on a reported position of the intruder in addition to the TCAS information, the pilot can instruct the system to perform a recalibration based on the position provided by the other system.

Embodiments of the present invention may also incorporate the function of a beam forming network for a TCAS directional antenna, as a post-processing operation within a field-programmable gate array (FPGA). Here, the signals from the four elements may each be routed to separate I/O demodulators which may be used to detect the amplitude and phase of the signal received on each antenna element. The phase/amplitude information may be processed and provided to the FPGA or other equivalent processing device with similar processing capability. For ease of reference, the processor that processes the phase/amplitude information will be referred to as the FPGA, although it should be understood that other implementations of the processor are also permitted.

As a subsequent operation within the FPGA, the digitized information may be combined in the same (or similar) manner that the element signals may be combined in the beam forming network of a TCAS directional antenna. As a result, the outputs of the FPGA may then simulate the output of a conventional TCAS directional antenna, in which the bearing information may be embedded within the amplitude ratio of adjacent beams. This approach may permit the reuse of surveillance algorithms and software developed and honed in connection with previous TCAS products.

In an alternative embodiment, the operation of the FPGA can be combined with the operations performed by TCAS products, in a single processor, which may be a multiple-core processor. Thus, there is no requirement that the FPGA or equivalent device provide outputs that are subsequently taken as inputs by further devices.

Embodiments of the present invention may also be used to determine the bearing of received replies or squitters from other systems. For example, embodiments of the present invention may be applied to universal access transceiver (UAT) replies. Likewise, it may be possible to apply the principle above in reverse to identify an error in GPS information based on a received reply or squitter of an intruder with a known bearing. Other applications of the present invention are not excluded.

Thus, certain embodiments of the present invention provide systems and methods that allow an antenna to provide bearing without requiring complex calibration circuitry or an internal beam forming network, though embodiments with such features are permitted. The antenna may take advantage of a fixed phase relationship between the elements of an array dependent on the angle of incidence of the incoming signal to perform a bearing calibration based on an intruder with known positional data. An alternate means of calibration may allow the pilot to select the intruder whose bearing he wishes to use as the source data for the calibration. The bearing may be manually entered by the pilot. Finally, embodiments of the present invention can also apply to UAT applications or any other application, if so desired.

Figure 4:
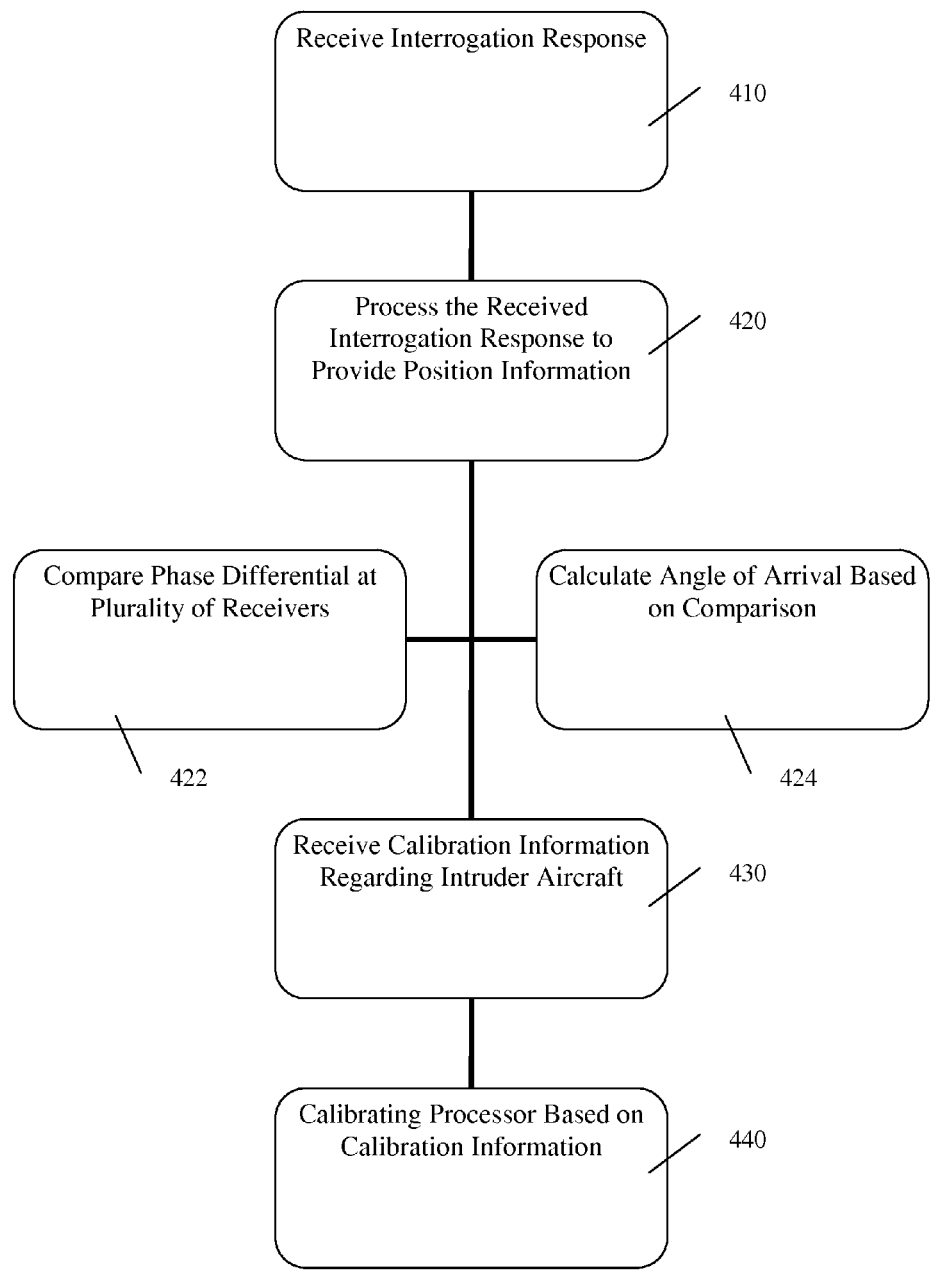
FIG. 4 illustrates a method according to certain embodiments of the present invention.

FIG. 4 illustrates a method according to certain embodiments of the present invention. As illustrated in FIG. 4, a method can include, at 410, receiving an interrogation response signal from an antenna array that lacks combiner circuitry or an antenna array not configured to operate with an internal self-test phase calibration mechanism. The interrogation response signal can be a signal from a transponder-equipped aircraft responding to an interrogation from a traffic advisory system (TAS) or traffic alert and collision avoidance system (TCAS). This method can be performed in a host aircraft. The interrogation response signal may be a response to a TCAS interrogation. The TCAS interrogation may be sent out by the host aircraft performing the method. The antenna can be a four element monopole array.

The method can also include, at 420, processing the received interrogation response signal to provide position information regarding an intruder aircraft. The processing the received interrogation response signal can include, at 422, comparing a phase differential identified at a plurality of receivers that received the TCAS signal. The processing the received interrogation response signal can further include, at 424, calculating an angle of arrival of the TCAS signal based on the comparing.

The angle of arrival information can be used to calculate the bearing of the intruder. This calculation can be performed in the same processor or a different processor.

The method can further include, at 430, receiving calibration information regarding the intruder aircraft. The calibration information can be an absolute position of the aircraft or it can be a bearing of the intruder aircraft with respect to the host aircraft. The absolute position can be provided in an unsolicited response.

The method can additionally include, at 440, calibrating the processor of the received interrogation response signal based on the calibration information. This calibration can include applying a correction factor to at least one output of a plurality of receivers that receive the signal from the antenna. The correction factor can be applied in the receiver itself or in a processor that compares the outputs of the receivers.

Figure 5:
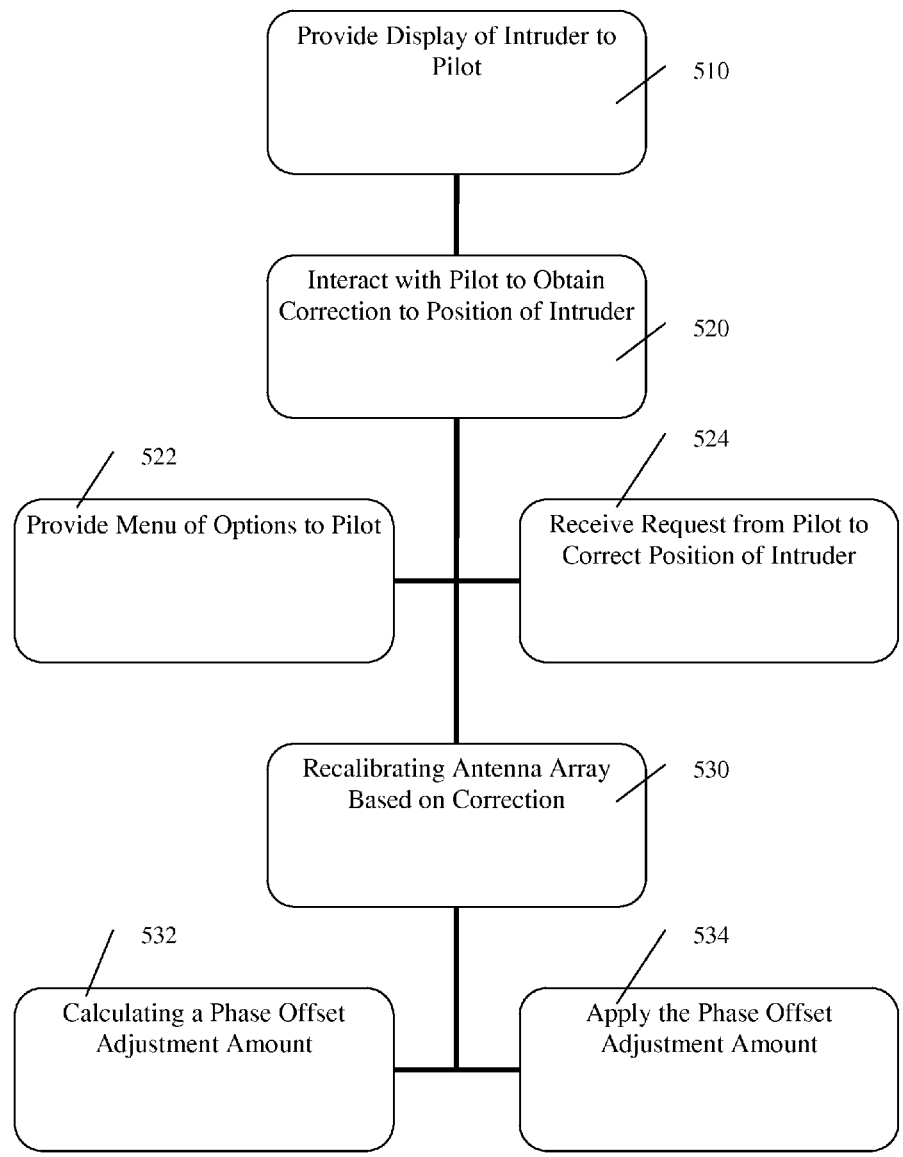
FIG. 5 illustrates another method according to certain embodiments of the present invention.

FIG. 5 illustrates another method according to certain embodiments of the present invention. As shown in FIG. 5, the method can include, at 510, providing a display of an intruder aircraft to a pilot.

The method can also include, at 520, interacting with the pilot to obtain a correction to a position of the intruder aircraft. The interacting with the pilot can include, at 522, providing a menu of options to the pilot, wherein the menu includes an option to correct a position of the intruder aircraft. The interacting with the pilot can include, at 524, receiving a request from the pilot to correct the position of the intruder aircraft. The correction to the position can be an absolute position of the intruder aircraft or a bearing of the aircraft with respect to the pilot's own aircraft.

The method can further include, at 530, recalibrating an antenna array based on the correction to the position of the intruder aircraft. The recalibrating the antenna array can include, at 532, calculating a phase offset adjustment amount for at least one of a plurality of receivers associated with the antenna array. The recalibrating the antenna array can further include, at 534, applying the phase offset adjustment amount as a calibration factor for the at least one of the plurality of receivers. The antenna array can be a TCAS antenna or a TAS antenna.

Figure 6:
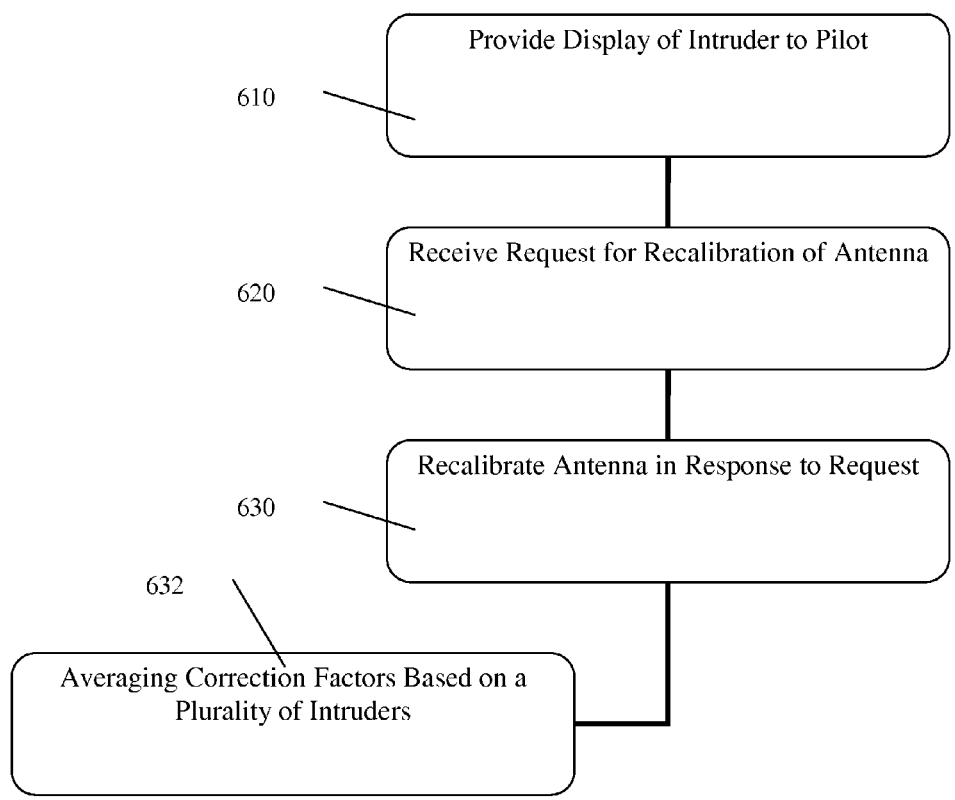
FIG. 6 illustrates a further method according to certain embodiments of the present invention.

FIG. 6 illustrates a further method according to certain embodiments of the present invention. As shown in FIG. 6, a method can include, at 610, providing a display of an intruder aircraft to a pilot. The display can include an option allowing pilot selection of a request for recalibration. This option can be a button or menu item. The option can be displayed when the display of the intruder aircraft is initialized. For example, the option can be displayed when the system is first powered on, or whenever the system is powered on. Alternatively, the option can be displayed periodically. For example, the option can be displayed weekly, monthly, or yearly. Other intervals are also permitted, such as bi-weekly or semi-annually.

The method can also include, at 620, receiving a request for recalibration of an antenna from the pilot. The method can further include, at 630, recalibrating an antenna in response to the request from the pilot.

The request for recalibration can include an absolute position of the intruder aircraft or the bearing of the intruder aircraft relative to a host aircraft of the pilot. Alternatively, the request for recalibration may not identify any particular intruder aircraft. Under such circumstances, the system performing the method may utilize position information obtained from, for example, Mode-S beacon information, or squitter, to recalibrate for a known intruder. Several intruders can be evaluated simultaneously, and their results can be averaged to provide final calibration factors for receivers of the antenna. Thus, the recalibrating can include, at 632, averaging correction factors based on a plurality of intruders.

Figure 7:
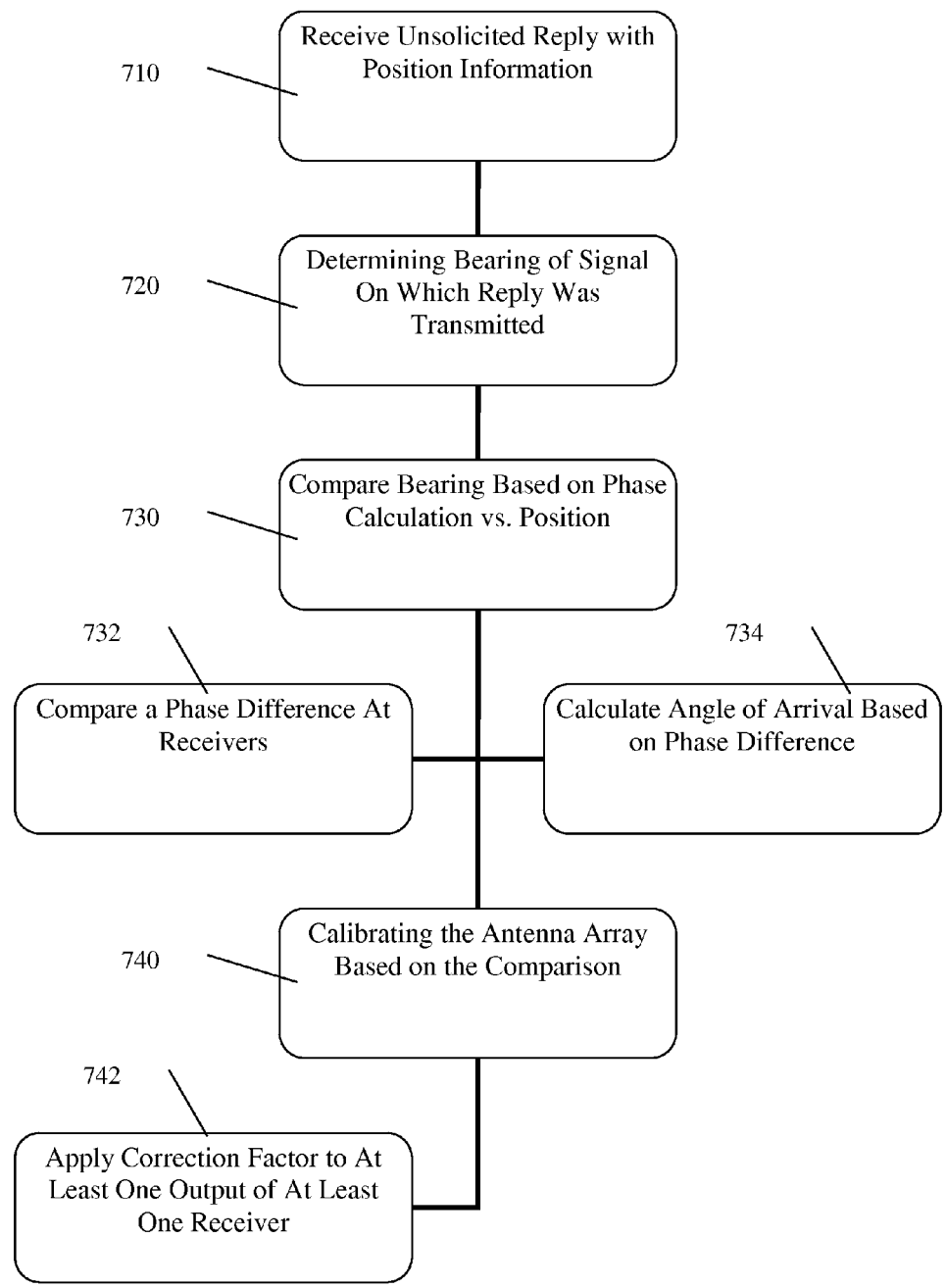
FIG. 7 illustrates a method according to another embodiment of the present invention.

FIG. 7 illustrates a method according to another embodiment of the present invention. As shown in FIG. 7, a method can include, at 710, receiving an unsolicited reply that contains absolute position information of an intruder aircraft. The unsolicited reply can, for example, be a Mode-S squitter or the like. Instead of absolute position, in certain embodiments relative position that can be translated into absolute position information is also permitted.

The method can also include, at 720, determining a bearing of a signal encoding the reply based on a phase relationship of the signals from an antenna array not configured to operate with an internal self-test phase calibration mechanism. The antenna may be equipped with a sum and difference combiner. Alternatively, the antenna may have no combiner circuitry. The antenna can be a four element monopole array.

The method can further include, at 730, comparing the bearing based on the phase relationship with a bearing calculated by a comparison of the absolute positions of a host aircraft and the intruder aircraft. The determining the bearing of the signal can include, at 732, comparing a phase differential identified at a plurality of receivers that received the signal. The determining the bearing of the signal further includes, at 734, calculating an angle of arrival of the signal based on the comparing.

The method can additionally include, at 740, calibrating the antenna array based on the result of the comparison. The calibrating the antenna array can include, at 742, applying a correction factor to at least one output of a plurality of receivers that receive the signal from the antenna array.

Figure 8:
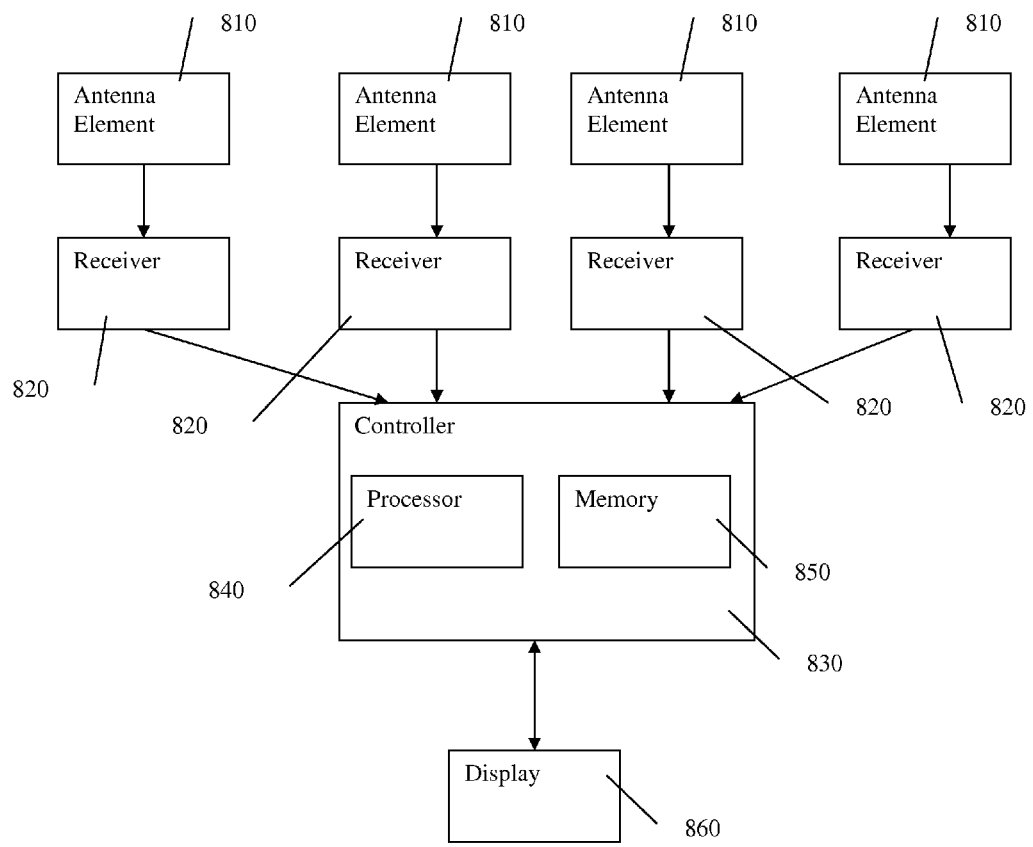
FIG. 8 illustrates a system according to certain embodiments of the present invention.

FIG. 8 illustrates a system according to certain embodiments of the present invention. As shown in FIG. 8, a system can include an antenna array comprised of a plurality of antenna elements 810, receivers 820, and a controller 830. The controller 830 may include one or more processors 840 and memory 850. The processors 840 and memory 850 can be variously embodied but can, in certain embodiments can be implemented using software provided as computer-readable instructions on a computer-readable medium, such as a non-transitory computer-readable medium. The system can also include a display 860, which may have its own memory, processors, and computer instructions.

The processors 840 and memory 850 can be configured to cause the system, or part of the system, such as the controller 830, to perform a method, such as one of the methods illustrated in FIGS. 4-7, or otherwise described above. It should be noted that FIG. 8 illustrates only a receive path. The system may also include a transmit path, and that transmit path may use either the same or different antenna elements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
   receiving, at an antenna array, an unsolicited reply encoded by a signal, wherein the unsolicited reply contains absolute position information of an intruder aircraft;
   determining, by a controller, a bearing of the signal encoding the reply based on a phase relationship of signals from the antenna array produced from reception of the signal, wherein the antenna array is not configured to operate with an internal self-test phase calibration mechanism;
   comparing, by the controller, the bearing based on the phase relationship with a bearing calculated by a comparison of the absolute positions of a host aircraft and the intruder aircraft; and
   calibrating, by the controller, the antenna array based on the result of the comparison.

2. The method of claim 1, wherein the antenna is equipped with a sum and difference combiner.

3. The method of claim 1, wherein the antenna comprises a four element monopole array.

4. The method of claim 1, wherein the determining the bearing of the signal comprises comparing a phase differential identified at a plurality of receivers that received the signal.

5. The method of claim 4, wherein the determining the bearing of the signal further comprises calculating an angle of arrival of the signal based on the comparing.

6. The method of claim 1, wherein the calibrating the antenna array comprises applying a correction factor to at least one output of a plurality of receivers that receive the signal from the antenna array.

7. A system, comprising:
   at least one processor; and
   at least one memory including computer program instructions,
   wherein the at least one memory and the computer program instructions are configured to, with the at least one processor, cause the system at least to
   determine a bearing of a signal encoding an unsolicited reply, wherein the signal is received at an antenna array, wherein the reply contains absolute position information of an intruder aircraft, wherein determination of the bearing is based on a phase relationship of signals from the antenna array produced from reception of the signal, wherein the antenna array is not configured to operate with an internal self-test phase calibration mechanism;
   compare the bearing based on the phase relationship with a bearing calculated by a comparison of the absolute positions of a host aircraft and the intruder aircraft; and
   calibrate the antenna array based on the result of the comparison.

\* \* \* \* \*